United States Patent [19]

Ito

[11] Patent Number: 4,727,400
[45] Date of Patent: Feb. 23, 1988

[54] DOCUMENT TABLE FOR DOCUMENT REPRODUCTION APPARATUS

[75] Inventor: Tatsuya Ito, Yamatokoriyama, Japan

[73] Assignee: Sharp Kabushiki Kaisha, Osaka, Japan

[21] Appl. No.: 865,787

[22] Filed: May 22, 1986

[30] Foreign Application Priority Data

May 23, 1985 [JP] Japan .............. 60-77133[U]

[51] Int. Cl.⁴ .............................................. G03B 27/62
[52] U.S. Cl. ..................................... 355/75; 355/3 R
[58] Field of Search ................... 355/3 R, 8, 75, 113, 355/118, 128, 131

[56] References Cited

U.S. PATENT DOCUMENTS

| | | | |
|---|---|---|---|
| 3,612,684 | 10/1971 | Jones et al. | 355/75 X |
| 3,642,376 | 2/1972 | Halvorsen et al. | 355/75 X |
| 3,704,944 | 12/1972 | Komori et al. | 355/8 |
| 3,957,370 | 5/1976 | Vola | 355/75 X |
| 4,014,607 | 3/1977 | Cherian | 355/75 X |
| 4,444,494 | 4/1984 | Koyama et al. | 355/75 |
| 4,595,285 | 6/1986 | Miwa et al. | 355/75 |
| 4,639,128 | 1/1987 | Anderson | 355/75 |

FOREIGN PATENT DOCUMENTS 1597162 6/1970 Fed. Rep. of Germany .

Primary Examiner—Fred L. Braun
Attorney, Agent, or Firm—Birch, Stewart, Kolasch & Birch

[57] ABSTRACT

A document table device for an electrophotographic copying machine or image scanner includes a transparent reciprocating table for carrying a document, a transparent pivotal document cover for pressing the document toward the table, and a pivotal light shield for shielding scanning light, the light shield covering only a portion of the document cover.

5 Claims, 4 Drawing Figures

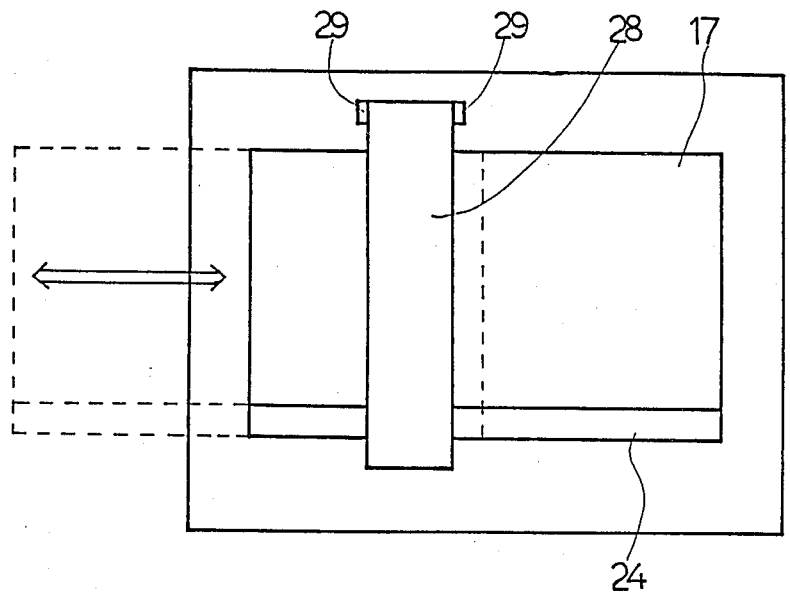
FIG.2
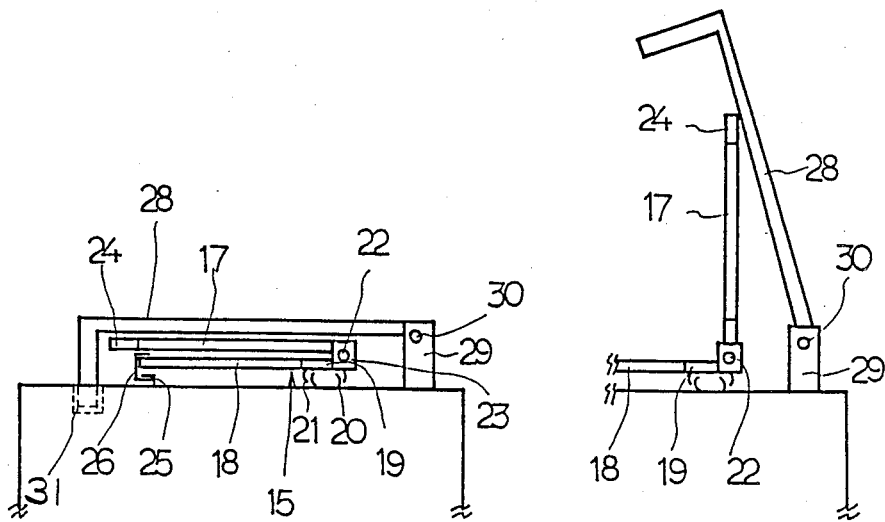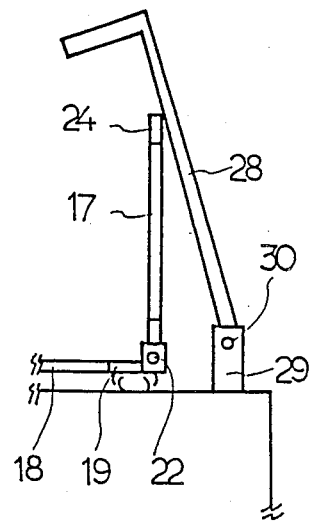
FIG.3  FIG.4

DOCUMENT TABLE FOR DOCUMENT REPRODUCTION APPARATUS

BACKGROUND OF THE INVENTION

The present invention relates to a document table for a document reproduction machine such as an electrophotographic copying machine and, more particularly, to a combination of a document table for carrying a document and a document cover for pressing it to the document table in a document reproduction machine such as an electrophotographic copying machine or image scanner.

In an electrophotographic copying machine, a document is placed on a transparent document table to produce an electrostatic latent image onto a photoreceptor by light scanning the document. The copying surface of the document faces to the front plane of the document table. Light from a light source impinges on the copying surface through the front plane. The reflected light is focused on the photoreceptor using lens and mirror system.

A pivotal document cover is conventionally provided for pressing the document on the document table. The document cover can prevent the emitted light from leaking outside and functioning as a white background of the document.

Conventionally, the size of the document cover is identical with the size of the plane of the document table so as to cover the whole area of the document table. The material of the document cover is nontransparent. Therefore, after the document cover is closed to cover the document for copying, the position of the document cannot be checked. Before a copied paper is made and discharged from the copying machine, it is not possible to detect that the document has slipped from the correct copying area after mounting it on the document table by the operator. Further, even after the copying of the document, the document may be forgotten on the document table.

SUMMARY OF THE INVENTION

Accordingly, it is an object of the present invention to provide an improved document table for a document reproduction machine for confirming the position of a document to be reproduced prior to and after the document reproduction.

It is another object of the present invention is to provide an improved document table and cover for a document reproduction machine such as a copying machine or an image scanner for confirming the position and presence of a document to be reproduced.

It is a further object of the present invention to provide an improved document table and cover for a document reproduction machine such as a copier or an image scanner for confirming the position and the presence of a document to be copied, the document being mounted on a document table reciprocated for light scanning the document.

Briefly described, in accordance with the present invention, a document table device for a document reproduction machine such as a copying machine or image scanner includes a transparent document table for carrying a document to be reproduced, the document table being reciprocated for light scanning and being made of a transparent material at a portion carrying the document, a pivotal document cover for covering the document and pressing it toward the document table, the document cover also being made of a transparent material at a portion covering the document and a light shield for shielding the light, the light shield being provided so as to cover the light scanning position of the transparent document cover.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 2 is a plan view of the document table of the present invention;

FIG. 3 is a side view of the document table of the present invention; and

FIG. 4 is a side view of the document table of the present invention, showing the document cover of FIG. 3 in an opened position.

DESCRIPTION OF THE PREFERRED EMBODIMENT

Figure 1:
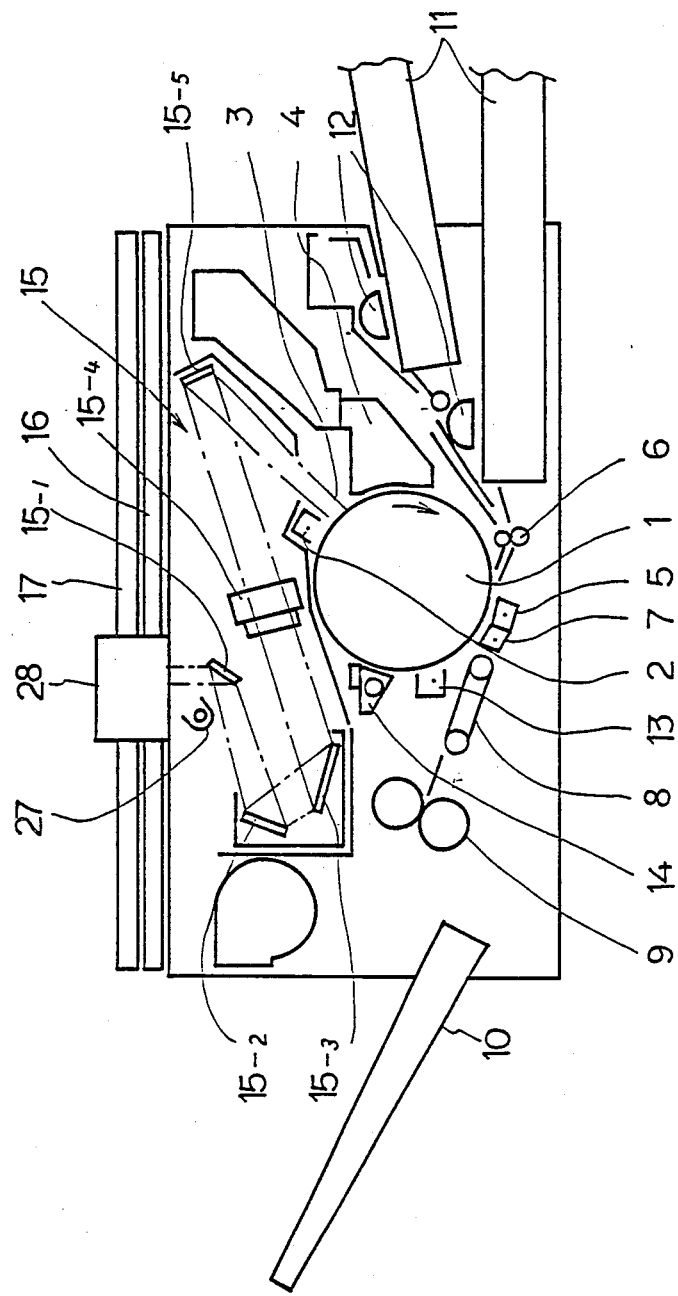
FIG. 1 is a side sectional view of a document reproduction machine such as an electrophotographic copying machine or image scanner with a transparent document table according to the present invention.

FIG. 1 shows a side sectional view of a document reproduction apparatus such as an electrophotographic copying machine including a document table according to the present invention. An image scanner can replace the copying machine. FIG. 2 is a plan view of the document table of the present invention.

Referring to FIG. 1, a photoreceptor 1 is formed around a drum, which is rotated in the arrow direction. A corona charger 2 is provided for uniformly charging the surface of the photoreceptor 1. A light pattern of a document to be copied is incident on a point 3 on the charged photoreceptor 1 to form an electrostatic latent image. A developer 4 is provided for developing the latent image on the photoreceptor 1 to produce a toner image. A transference charger 5 is provided for transferring the toner image from the photoreceptor to a copy paper. The copy paper is transported with a pair of guide rollers 6. A separation charger 5 is provided for electrostatically separating the copy paper from the photoreceptor 1. A belt transport device 8 is provided for transporting the separated copy paper toward a pair of fixing rollers 9. A paper tray 10 is provided for receiving the discharged paper from the pair of fixing rollers 9. A plurality of copy papers are stacked in a paper cassette 11. A pick-up roller 12 is opposed to the top surface of the stacked papers. The picked-up paper is guided to the pair of transport rollers 6. The pair of transport rollers 6 are provided for sending a single copy paper sheet to the transference position in synchronization with the rotation of the photoreceptor 1.

After the image transference and the copy paper separation, the photoreceptor 1 is rotated to be opposed to an AC corona charger 13 and a charge-removal light source 14 to remove the remaining charges from the photoreceptor. By being opposed to the developer 4, the remaining toner of the photoreceptor 1 is cleaned by the developer 4. An optical system 15 includes mirrors and lenses is provided for projecting the light image to the position 3 on the photoreceptor 1.

To project the light image of the document, a document table 16 is provided with a transparent glass plate carrying the document. The document table 16 is positioned at the top side of the copying machine and can be reciprocated while carrying the document. A pivotable document cover 17 is provided for covering the document.

FIG. 3 is a sectional view of the document table 16. The document table 16 comprises a transparent document-carrying glass plate 18, of which the end is supported with a support 19. A slide 21 is provided with the support 19 for moving the document table 16 along a guide rail 20 connected to the body of the copying machine, so that the table 16 can be reciprocated in synchronization with the rotation of the photoreceptor 1. Further, the support 19 is provided with a support 23 pivotally supporting the end of the document cover 17 at a shaft 22, so that the document cover 17 can pivot around the document table 16. At the other end of the document cover 17, a handle 24 is provided for opening or closing the document cover 17. At the area except for the handle 24 (being opposed to the transparent glass plate 18), the document cover 17 is transparent. The end of the document table 16 (opposed to the support 19 of the transparent glass plate 18) is directly supported on a base 25 of the copying machine body. A rectangular frame 26 integrally combines the glass plate 18 and the support 25.

A scanning slit is formed at the top side of the copying machine, through which the light can be emitted toward the document mounted on the document table 16. As opposed to the slit, a light source 27 including a lamp and a reflector is disposed within the copying machine for directing the light toward the document. The light reflected by the document is incident upon the photoreceptor through mirrors 15-1, 15-2, and 15-3, a lens 15-4, and a mirror 15-5. A light shield 28 is provided for preventing the light from leaking, and is opposed to the light source 27 and the scanning slit. The light shield 28 is pivotally disposed to a support 29 with a shaft 30. The end of the support 29 is secured to the base of the copying machine. When the light shield 28 is closed, the free end of the light shield 28 is put into a concave recess 31 formed on the body of the copying machine.

Since the document cover 17 on the document table 16 is transparent, some light from the light source 27 may leak. The light shield 28 is provided, so that when it is closed, the light leakage may be prevented.

FIG. 4 is a condition of opening the document cover 17. As shown in FIG. 4, when the document cover 17 is upright at about 90 degrees, it can maintain itself in that position. While it is opened, the light shield 28 is positioned at the tip of the document cover 17 (handle 24).

In the thus arranged copying machine, to mount a document to be copied on an appropriate position on the transparent galss plate 18 of the document table 16, the document cover 17 is opened. By lifting the handle 24 of the document cover 17, it pivots around the shaft 22. As shown in FIG. 4, it is opened about 90 degrees so is maintained in that position. The light shield 28 pivots according to the opening of the document cover 17 because of the contact with the tip of the handle 24. It is thus opened and maintained in an opened position as shown in FIG. 4.

When the document cover 17 is opened as seen in FIG. 4, the document is mounted on the appropriate position on the transparent glass plate 18 of the document table 16. Then the document cover 17 is closed with the handle 24. Since, in such a case, the total weight of the light shield 28 is supported by the handle 24 of the document cover 17, according to the closing operation of the document cover 17, the light shield 28 is also closed with its weight. When the document cover 17 is closed as seen in FIG. 3, thus the light shield 28 is also closed, so that the tip of the light shield 28 is put into the concave recess 31.

Since the document cover 17 is transparent, the document mounted on the document table 16 is visible, so that it can be easily detected whether the position of the document has slipped from the exact copying position. In the condition of FIG. 3, a copy start switch is operated to start the copying operation, so that the document table 16 is reciprocated together with the document cover 17. As the light shield 28 is opposed to the light source 27 and the light shield 28 is closed according to the closing of the document cover 17, light will not leak. Preferably, the inner side of the light shield 28 facing the document cover 17 is made white, so that a solid portion copied due to the absence of any document to be copied can be avoided.

After the end of the copying operation, the document table 16 and the document cover 17 have been reciprocated and returned to the original position, so that the presence of the document on the document table 16 can be easily recognized, thereby avoiding the error of forgetting the document on the document table 16.

In the above description, although the document table 16 is reciprocated, the light shield 28 is fixed on the body of the copying machine. To move the document table 16 smoothly by reducing the friction between the light shield 28 and the document cover 17, the light shield 28 may be provided with a roller facing the body of the copying machine.

According to the present invention, the document table carrying the document is made movable, the pivotal transparent document cover is provided for pressing the document onto the document table, and the light shield is provided for shielding the scanning light, the light shield covering the document cover. The exact position of the document to be copied can be checked. Further the forgetting of the document can be avoided after the copying operation is completed.

While only certain embodiments of the present invention have been described, it will be apparent to those skilled in the art that various changes and modifications may be made therein without departing from the spirit and scope of the present invention as claimed.

What is claimed is:

1. A document table device for a document reproduction apparatus comprising:
   transparent document table means for supporting a document to be copied;
   transparent document cover means for covering the copy document and pressing the copy document toward said document table means;
   a light source positioned beneath said document table means for directing a light beam of a predetermined width toward the copy document in a copying operation, said light source being relatively movable with respect to said table means and said cover means; and
   light shield means for shielding light generated by said light source, said light shield means being optically aligned with and in fixed relationship to said light source and of a predetermined width substantially equal to the width of the light beam of said light source.

2. The device according to claim 1, wherein said document reproduction apparatus is an electrophotographic copying machine.

3. The device according to claim 1, wherein each of said transparent document cover means and said light shield means are pivotable, and further comprising means for receiving the tip of said pivotable light shield means when said document cover means and said light shield means are pressing the copy document toward said document table means.

4. The device according to claim 1, wherein said document cover means is reciprocable with said document table means, while said light shield means is fixed to the document reproduction apparatus.

5. The device according to claim 1, wherein said document reproduction apparatus is an image scanner.

* * * * *